March 23, 1926.

F. MONTIGLIO 1,577,585

PROPELLING MECHANISM FOR BICYCLES

Filed Sept. 22, 1925

Witnesses
Chas. L. McDonald
Howard D. Orr

Inventor
Franck Montiglio

By
E. G. Siggers
Attorney

Patented Mar. 23, 1926.

1,577,585

UNITED STATES PATENT OFFICE.

FRANCK MONTIGLIO, OF WICHITA, KANSAS.

PROPELLING MECHANISM FOR BICYCLES.

Application filed September 22, 1925. Serial No. 57,886.

*To all whom it may concern:*

Be it known that I, FRANCK MONTIGLIO, a citizen of the United States, residing at Wichita, in the county of Sedgwick and State of Kansas, have invented new and useful Improvements in Propelling Mechanism for Bicycles, of which the following is a specification.

This invention relates to propelling mechanism for bicycles.

The object is to improve the mechanism for propelling bicycles or other foot propelled vehicles and to provide means whereby greater power may be transmitted to the drive shaft and thence to the rear wheel axle with a relatively reduced expenditure of energy on the part of the rider, and at the same time to enable the latter to attain greater speed in the propulsion of the machine.

Another object is to provide means of this character which may be readily incorporated in a bicycle of the safety type, and having the usual general construction without necessitating any material change or alteration in the same, said means being capable of adjustment for the purpose of adapting the same to riders of different sizes and to adapt the machine for ordinary riding or for racing.

A full and complete understanding of the invention may be obtained from a consideration of the following detailed description taken in connection with the accompanying drawing forming a part of this specification, it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures.

Figure 1:
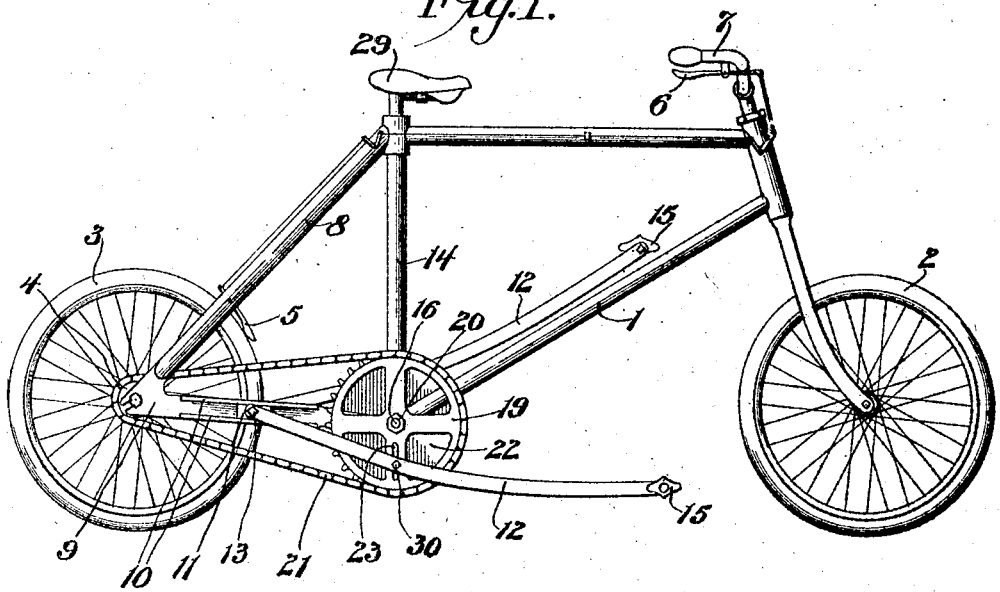
Figure 1 is a side elevation of a bicycle having the improved propelling mechanism applied thereto.
Figure 2:
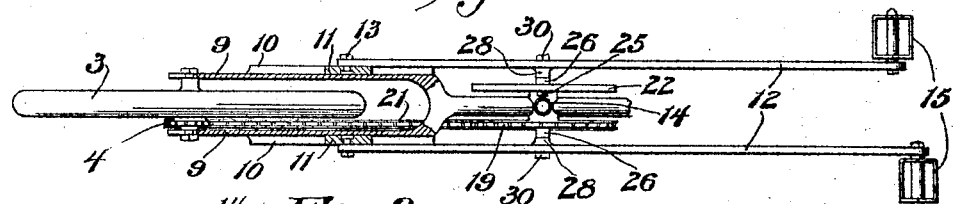
Figure 2 is a horizontal sectional view through the propelling mechanism.
Figure 3:
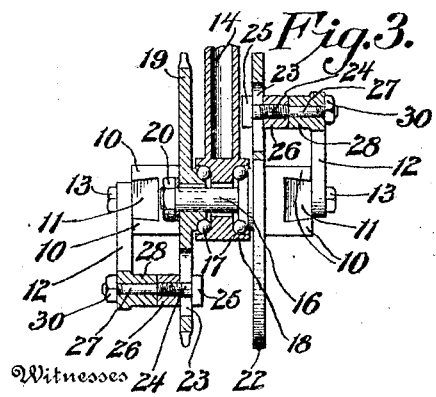
Figures 3 and 4 are detail sectional views of the same.
Figure 4:
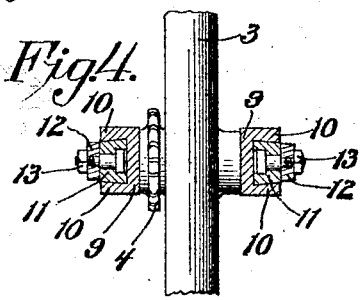

Referring to the drawing there is shown in Figure 1 what is well known as a safety bicycle, having the usual frame 1 mounted on the front steering wheel 2, and the rear drive wheel 3, all of which may be built in accordance with the usual custom.

The rear wheel which carries the small sprocket wheel 4 is also adapted to be under the control of the brake mechanism 5 which is actuated, as is customary, by the hand lever 6 mounted in any desired manner on the handle bars 7, said brake proper being preferably mounted for pivotal action between the rear, inclined forks 8.

The lower, substantially horizontal forks 9 which straddle the rear drive wheel 3 of the bicycle are provided with upper and lower outwardly extending, horizontal flanges 10, preferably having their opposed faces undercut to provide a dove-tailed channel extending the major portion of the length of said lower forks 9. Longitudinally-slidable blocks 11 are mounted for reciprocation in said channels, and during the operation of the propelling mechanism, are adapted to freely slide backwardly and forwardly in said channels, each side of the machine, of course, being provided with the same.

Arcuate foot levers 12 have one terminal thereof pivotally connected to the sliding blocks 11 by the screws or bolts 13, and said levers, which are curved so as to avoid contact with the ground, extend forwardly beyond the upright saddle post 14 to a position in rear of the steering wheel 2, and in proper position to receive the feet of the driver upon the usual pedals 15 carried by the forward ends of said levers.

The drive shaft 16 is mounted transversely of the machine in the usual anti-friction devices 17 carried in the hub or bearing 18, and projects at either side beyond said bearing sufficiently to receive on the right hand side the usual drive sprocket 19 of relatively large size and held on the shaft by a nut 20, the said sprocket wheel being of usual formation and occupying a position directly in front of and in longitudinal alinement with the rear sprocket 4 to which the same is connected by the wheel sprocket chain 21.

The other end of the drive shaft 16 carries an integral head or disc 22 of a diameter substantially equal to the diameter of the drive sprocket 19, and the said disc and sprocket each carry the usual ball race formed integrally therewith.

The sprocket wheel 19, which may be either of solid formation, or provided with spokes, is provided with a radially disposed slot 23 at one side of the center of the wheel or axis of rotation, and the disc 22 is likewise provided with a similar slot located at a diametrically opposite point, and said slots are adapted to receive bolts 24 having their heads 25 located at the inner sides thereof and clamped in adjusted positions in the opposite slots by lock nuts 26, thus permitting the said bolts to be moved in different positions with relation to the axis of rotation and to be rigidly clamped in said positions.

The bolts 24 where projecting beyond the lock nuts 26, are reduced as at 27, and are adapted to pass through suitable apertures formed in the foot levers 12, which are provided with integral sleeves or bosses 28 so as to space the foot levers from the sprocket and disc respectively in proper longitudinal alinement with the machine.

When the rider is mounted upon the saddle 29 in the usual position at the top of the post 14, he may assume a more natural, upright position when his feet are placed upon the pedals 15, and by a simple up and down movement of the latter the machine is caused to be propelled over the ground at a speed depending upon the adjustment of the bolts 24 in their respective slots 23 of the wheel and the disc. When it is desired to ride with greater ease and at a slower rate of speed the bolts 24 are moved towards the outer ends of said slots and clamped in position by clamp nuts 30. This results in a greater leverage by reason of the increased distance between the bolts 24 and the axis of rotation, the bolts being then nearer to the periphery of the sprocket wheel 19 upon which the pull of the chain 21 takes place. This adjustment also necessitates a greater extent of up and down movement of the feet of the rider but by reason of the longer leverage requires less actual downward pressure and exertion on his part. For the purpose of greater speed, however, the pivotal connections 24 are moved inwardly towards the axis of rotation about the shaft 16 and tightly clamped by the lock nuts 26 in their adjusted positions when the leverage is less, and permits of more rapid up and down movement of the feet but with a greater required amount of power. When the machine is in motion the blocks 11 are caused to travel backwardly and forwardly in their respective dove-tail channels between the flanges 10 which prevent their dislodgment from the same.

From the foregoing it will be seen that means have been provided for application to the frame of an ordinary bicycle which do not add materially to the weight or the bulk of the same, and which enables the rider to drive the machine with less exertion when ordinary speed is desired, and which may be adjusted to render the machine capable of attaining great speed by simply moving the bolts connecting the pedal levers to the sprocket wheel and drive disc.

What is claimed is:

1. Propelling mechanism for bicycles comprising longitudinal, horizontal guideways located at either side of the rear drive wheel, slidable blocks mounted in the guideways, a drive shaft having a drive sprocket and chain connection to the rear wheel, said sprocket having a radial slot, a disc carried by the shaft on the opposite side of the bicycle and having a radial slot diametrically opposite to the first named slot, pedal levers terminally pivoted at their rear ends to said sliding blocks, and means for intermediately pivoting the levers in adjusting position in the oppositely-disposed slots in the drive sprocket and disc respectively.

2. Propelling mechanism for bicycles, etc. comprising substantially horizontal guideways located at either side of the rear drive wheel, slidable blocks mounted in the guideways, a drive shaft having a drive sprocket and chain connection to the rear wheels, a disc carried by the drive shaft at the opposite side of the machine, pedal levers terminally pivoted at their rear ends to said sliding blocks, and means for intermediately pivoting the levers to said disc and said drive sprocket respectively, said pivotal connections being adjustable.

In testimony that I claim the foregoing as my own, I have hereto affixed my signature.

FRANCK MONTIGLIO.